United States Patent
Gopal et al.

(10) Patent No.: US 8,291,552 B2
(45) Date of Patent: Oct. 23, 2012

(54) BUCKLE

(75) Inventors: Prasanna Gopal, Colombo (LK); Andrew Alexander Davies, Shropshire (GB)

(73) Assignee: AMSAFE Bridport Limited (GB)

( * ) Notice: Subject to any disclaimer, the term of this patent is extended or adjusted under 35 U.S.C. 154(b) by 506 days.

(21) Appl. No.: 12/496,068

(22) Filed: Jul. 1, 2009

(65) Prior Publication Data

US 2010/0000061 A1 Jan. 7, 2010

(30) Foreign Application Priority Data

Jul. 1, 2008 (GB) .................................. 0811977.8

(51) Int. Cl.
*B25B 25/00* (2006.01)

(52) U.S. Cl. .................... 24/68 CD; 24/69 R; 24/70 ST; 24/69 CT; 24/71 ST

(58) Field of Classification Search .................. 24/69 R, 24/70 ST, 69 CT, 71 R, 71 CT, 71 ST, 71 T, 24/68 T, 69 ST, 69 T, 68 R, 273, 191, 193, 24/71 SB, 71 TD, 68 E, 68 CD; 410/100, 410/103
See application file for complete search history.

(56) References Cited

U.S. PATENT DOCUMENTS

| | | | | |
|---|---|---|---|---|
| 2,852,827 A * | 9/1958 | Arnold | .......................... | 24/68 R |
| 3,099,055 A * | 7/1963 | Huber | .......................... | 410/103 |
| 3,274,656 A * | 9/1966 | Hamann | .......................... | 24/196 |
| 3,365,756 A * | 1/1968 | Bayon | .......................... | 24/700 |
| 3,866,272 A * | 2/1975 | Prete et al. | .................. | 24/68 CD |
| 4,001,920 A | 1/1977 | Johnson | | |
| 4,118,833 A * | 10/1978 | Knox et al. | ................. | 24/68 CD |
| 4,154,427 A * | 5/1979 | Hofmann | .................. | 24/68 CD |
| 4,395,796 A * | 8/1983 | Akaura et al. | ............. | 24/68 CD |
| 4,507,829 A * | 4/1985 | Looker | ...................... | 24/68 CD |
| 4,584,741 A * | 4/1986 | Kawahara et al. | ......... | 24/68 CD |
| 4,608,735 A * | 9/1986 | Kasai | ............................. | 24/196 |
| 4,809,953 A * | 3/1989 | Kurita et al. | .................. | 254/250 |
| 4,951,365 A * | 8/1990 | Loyd | .......................... | 24/68 CD |
| 4,987,653 A * | 1/1991 | Lin | ............................. | 24/68 CD |
| 5,832,569 A | 11/1998 | Berg | | |
| 6,615,456 B1 * | 9/2003 | Huang | ........................ | 24/68 CD |
| 7,004,695 B1 * | 2/2006 | Wen-Hsiang | .................. | 410/21 |
| 7,020,933 B2 * | 4/2006 | Chang | ........................ | 24/68 CD |
| 7,231,693 B2 * | 6/2007 | Wilcox et al. | ................. | 24/68 R |
| 7,712,191 B2 * | 5/2010 | Huang | ........................ | 24/68 CD |
| 2003/0041420 A1 * | 3/2003 | Kosh et al. | ...................... | 24/193 |
| 2003/0131451 A1 * | 7/2003 | Brown | ........................ | 24/68 CD |
| 2007/0193001 A1 * | 8/2007 | Huang | ........................ | 24/71 ST |

FOREIGN PATENT DOCUMENTS

| | | | |
|---|---|---|---|
| EP | 0906732 A1 | | 4/1999 |
| GB | 2348240 A | | 9/2000 |
| GB | 2444152 A | * | 5/2008 |

* cited by examiner

*Primary Examiner* — Robert J Sandy
*Assistant Examiner* — Rowland D Do
(74) *Attorney, Agent, or Firm* — Strategy IP

(57) ABSTRACT

A buckle includes a buckle body with spaced apart wall and a pivot bar extending between the side walls and a handle with a cam member and a pair of support slots. The support slots receive the pivot bar to engage the handle with the body such that the handle can pivot between an open position, in which a strap may be threaded upon the handle, and a closed position, in which tension is applied to the strap threaded upon the handle. The engagement between the support slots and the pivot bar permits the handle to slide relative to the buckle body.

18 Claims, 3 Drawing Sheets

BUCKLE

BACKGROUND

The present invention relates to a buckle.

Buckles have been used for a long time as tensioning and length adjusting devices, in particular in the aviation and road transport industries. For example, they have been used in conjunction with straps for securing a load or securing sheeting which is used to cover a load. Conventional buckles have a handle over which a strap is threaded, the handle being movable in an over centre manner to tension and secure the strap. Such buckles are generally known as over-centre buckles. The handle in an over-centre buckle is movable from an open position, in which a strap may be threaded onto the handle, to a closed position, in which the strap is secured under tension. The handles are generally provided with a locking mechanism for securing the handle in the closed position during use.

The present inventors have identified a problem with the conventional buckle design, namely that the buckle tends to allow the strap to slip when it is subjected to repetitive high frequency (e.g. 1 Hz), low force cyclic loads (e.g. gust loads experienced in aviation). This is thought to be due to the fact that when the tension is reduced the strap, which tends to be quite stiff, pushes through the buckle and loosens around the handle. When the tension is then reapplied this causes the strap to slip by a small amount. Through repeated cycles of loosening and tensioning the amount of strap slippage accumulates until the increase in strap length becomes quite noticeable and potentially dangerous.

BRIEF SUMMARY OF THE INVENTION

It is the object of the present invention to overcome the limitations of the prior art, or at least to provide an alternative buckle to those currently available.

According to the present invention there is provided a buckle comprising a buckle body with spaced apart side walls and a pivot bar extending between the side walls, and a handle with a cam member and a pair of longitudinal support slots, the longitudinal support slots being configured to receive the pivot bar to engage the handle with the body such that the handle can pivot between an open position, in which a strap may be threaded upon the buckle, and a closed position, in which tension is applied to the strap threaded upon the buckle, wherein the engagement between the longitudinal support slots and the pivot bar permits the handle to slide relative to the buckle body.

The term "strap", as used herein, is a general term which is intended to cover strap, rope, webbing, cable and any other term which may be used to describe a length of material which may be used in conjunction with a buckle as described. The strap may be of any suitable material including, but not limited to, natural materials, metallic materials and plastics materials.

The cam member is provided on the handle and moves about the pivot bar when the handle is pivoted. In use of the buckle the strap is threaded around the pivot bar. When the handle is in the open position the cam member is passive and it does not exert any force on the strap. When the handle is moved into the closed position the cam member moves around the pivot bar and into contact with the strap. In the closed position the strap passes around the cam member and is held under tension.

The support slots extend along a longitudinal axis of the handle. The longitudinal support slots permit the handle to move relative to buckle body. When the handle is in either the fully open or fully closed position it is able to slide relative to a longitudinal axis of the buckle body. When the handle is in the closed position it can slide from a first position, in which the cam member is spaced from the pivot bar, to a second position, in which it is adjacent to the pivot bar.

In the first position there is a gap between the cam member and the pivot bar and the strap passes freely through the gap. When tension is applied to the strap it exerts a force on the handle which causes it to move from the first position to the second position, thus trapping the strap between the cam member and the pivot bar.

In an embodiment of the invention the handle is provided with a resilient biassing member which biases it into the first position. In order for the handle to move from the first position to the second position the biassing force must be overcome. When tension is applied to the strap, e.g. a pulling force on the strap such as a gust load, the handle acts against the resilient biassing member and moves from the first position into the second position. The strap is then trapped between the cam member and the pivot bar, which prevents it from slipping through the buckle. When the pulling force subsides the resilient biassing member causes the handle to return to the first position. The buckle is therefore provided with means for securely gripping the strap which is actuated by the pulling forces which would normally cause a strap to slip through a conventional buckle.

In an embodiment of the invention the handle is provided with a locking member which is capable of engaging with the buckle body to secure the handle into the closed position. The locking member typically comprises a pair of latches which engage with recesses on the buckle body to secure the handle in the closed position. A resilient biassing member biases the latches into the locked position and must be overcome to engage and disengage the latches with the recesses.

In an embodiment of the invention the resilient biassing member which biasses the handle into the first position also biasses the locking member into the locked position.

In an embodiment of the invention the buckle comprises strap trapping means arranged such that when the handle is in the closed position the strap trapping means defines a channel for a strap threaded upon the handle.

The strap trapping means defines a channel for the strap when the handle is in the closed position. This serves to prevent, or at least reduce, any slippage of the strap through the buckle during use by preventing or reducing slippage and/or preventing or reducing ballooning. When a textile webbing strap is compressed along its length the individual textile strands "balloon" out of the plane of the strap and this is undesirable as it can cause the strap to slip through the buckle.

In an embodiment of the invention the buckle may be provided with more than one strap trapping means. This can serve to increase the efficiency of the buckle in preventing, or reducing, strap slippage.

In an embodiment of the invention the strap trapping means may define a channel for the strap which is the same depth as, or slightly deeper than, the thickness of the strap passing through the channel, which will typically be a double thickness of strap material. The "depth" of the channel is defined as the size of the gap created by the strap trapping means, through which the strap passes. It is believed that by providing a narrow channel which is the same depth or only slightly deeper than the thickness of the strap that slippage can be prevented or reduced. This is believed to be due to the fact that the channel restricts movement of the strap which can be caused by the high frequency, low force cyclic loads. The cyclic loads cause the strap to be repeatedly stretched and compressed along its length and this can gradually cause the strap to slip through the buckle over time. This is particularly true when the strap is made from a textile webbing. When a textile webbing strap is compressed along its length the individual textile strands "balloon" out of the plane of the strap. The size of the channel defined by the strap trapping means closely corresponds to the thickness of the strap and this prevents this "ballooning" and thus helps to prevent or reduce slippage. The strap trapping means does not compress the strap, but provides a closely profiled channel which restricts unwanted movement of the strap.

As will be seen in FIG. 2-5, the strap in an over-centre buckle is typically fed into the buckle, wound around the pivot pin and fed back out of the buckle along the same path. This means that the strap in the buckle is generally present as a double layer of strap material. As a consequence of the double thickness of strap material the channel will typically be the same depth as, or slightly deeper than a double thickness of strap material. In instances where the strap is only present as a single layer of material then clearly the depth of the channel will be reduced accordingly.

In this embodiment the function of the strap trapping means is to profile the strap and prevent it from moving out of plane, i.e. by "ballooning", rather than to compress it. The terms "profile" and "profiled", as used herein, mean that the depth of the channel closely corresponds to the thickness of the strap, such that the strap cannot move out of plane, i.e. by "ballooning".

As will be seen in FIGS. 2-5, the strap in an over-centre buckle is typically fed into the buckle, wound around the pivot pin and fed back out of the buckle along the same path. This means that the strap in the buckle is generally present as a double layer of strap material. As a consequence of the double thickness of strap material the channel will typically be the same depth as, or slightly deeper than a double thickness of strap material. In instances where the strap is only present as a single layer of material then clearly the depth of the channel will be reduced accordingly.

In an alternative embodiment of the invention the strap trapping means defines a channel which compresses the strap when the handle is in the closed position. The compression of the strap restricts movement of the strap which can be caused by the high frequency, low force cyclic loads. The cyclic loads cause the strap to be repeatedly stretched and compressed along its length and this can gradually cause the strap to slip through the buckle over time. This is particularly true when the strap is made from a textile webbing. When a textile webbing strap is compressed along its length the individual textile strands "balloon" out of the plane of the strap.

In an embodiment of the invention the strap trapping means may comprise a strap trapping member which is associated with the cam member, such that when the handle is moved from the open position to the closed position the cam member moves into close proximity with the strap trapping member. The distance between the strap trapping member and the cam member, when the handle is in the closed position, is defined as the depth of the channel. The term "into close proximity" refers to a position relative to the strap trapping member which is sufficient to define a suitable channel for the strap. This position will vary depending on the size of the buckle, the thickness of the strap used and whether the channel is intended to profile or compress the strap.

In an embodiment of the invention the strap trapping member may be in the form of a plate. The plate may conveniently extend upwardly from the base of the buckle. The plate will only be supported at one end and will act as a simple spring.

In an embodiment of the invention the plate may be orientated perpendicular to the side walls.

In an embodiment of the invention the plate may be angled towards the cam member. This improves the ability of the plate and the cam member to "trap" the strap. The plate may conveniently be angled from between 45□ to 90□ relative to a plane defined by the base of the buckle body. More preferably, the plate may be angled from 60□ to 80□ relative to the plane defined by the base of the buckle body. Most preferably, the plate may be angled at approximately 75□ relative to the plane defined by the base of the buckle body. The angle of the plate relative to the buckle body will be discussed in more detail with reference to the FIGS. 3 and 4.

In an embodiment of the invention the strap trapping member comprises a curved surface which opposes the cam member when the handle is in the closed position.

In an embodiment of the invention the strap trapping member is associated with an aperture in the rear of the buckle, such that a length of webbing may pass through the aperture and loop around the curved surface to attach it to the buckle.

In an embodiment of the invention the strap trapping member may have a roughened surface to increase friction between itself and the strap when the buckle is in the closed position. The surface of the strap trapping member may be knurled, toothed or provided with any other surface features which serve to increase friction between the strap trapping member and the strap and prevent the strap from slipping.

In an embodiment of the invention the strap trapping means may comprise mating members, a first member being provided on the handle and a second member being provided on the buckle body, the arrangement being such that when the handle is moved from the open position to the closed position the mating members come together. In an embodiment of the invention the mating members come together to define a gap which is approximately equal to, or slightly larger than, the thickness of a double layer of the strap in its normal, relaxed state. This ensures that the mating members come together to define a channel for the strap when the handle is in the closed position. The channel profiles the strap to prevent "ballooning" of the strap or other movement which may cause slippage of the strap. The gap formed between the mating members is referred to as the depth of the channel.

In an alternative embodiment of the invention when the mating members come together they define a gap which compresses the strap. As discussed previously, the compression prevents the strap from sliding through the buckle and also prevents ballooning.

In an embodiment of the invention the mating members are in the form of plates. This increases the surface area which comes into contact with the strap and as a result improves the performance of the buckle in preventing, or reducing, slippage.

In an embodiment of the invention one or both of the mating members may have a roughened surface to increase friction between itself and the strap when the buckle is in the closed position. The surface of the mating member may be knurled, toothed or provided with any other surface features which serve to increase friction between the mating member and the strap and prevent the strap from slipping.

BRIEF DESCRIPTION OF THE DRAWINGS

For a better understanding of the present invention reference will now be made, by way of example, to the accompanying drawings, in which.

DETAILED DESCRIPTION OF THE PREFERRED EMBODIMENTS

Figure 1:
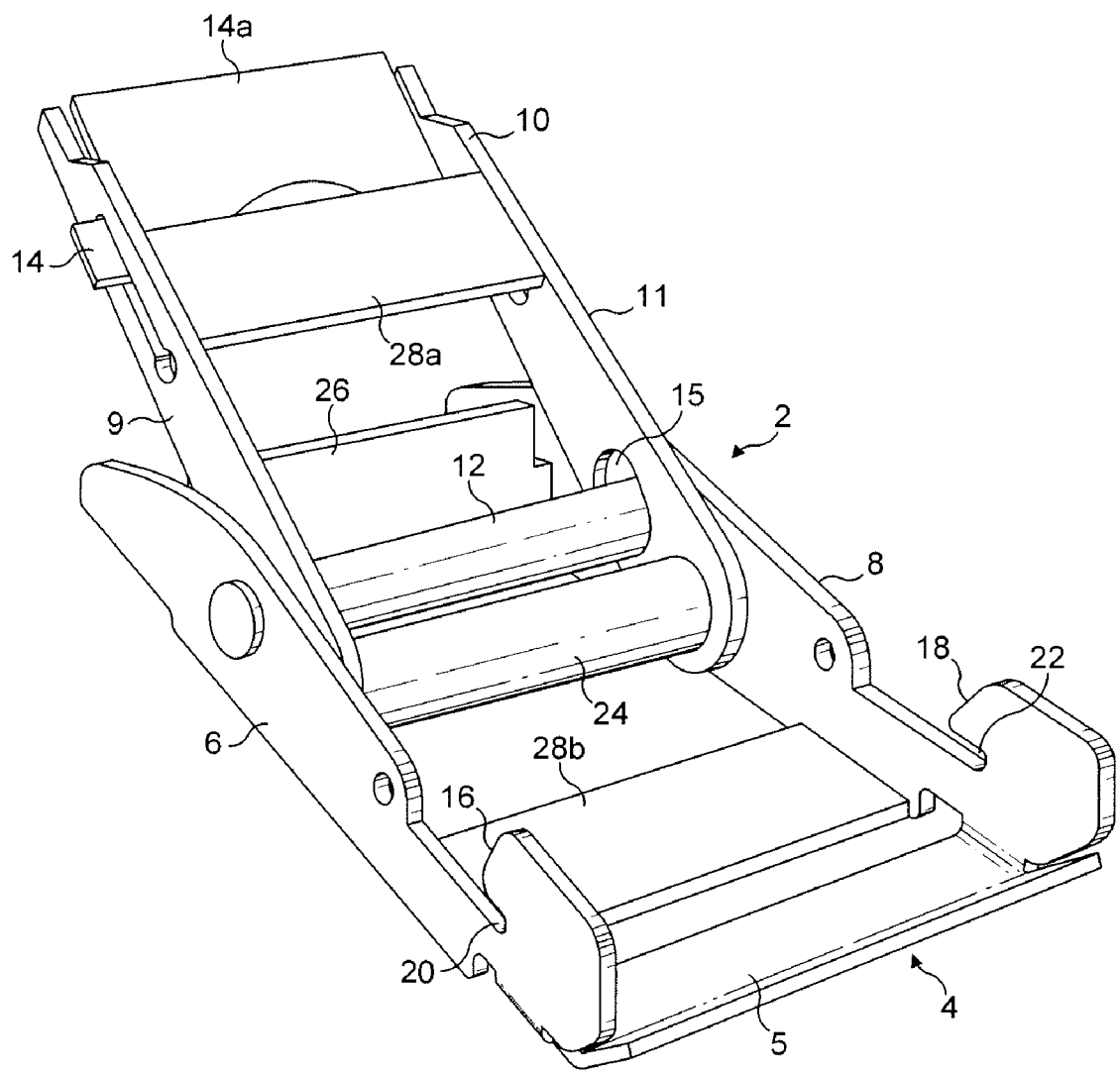
FIG. 1 is a perspective view of a buckle according to the present invention in an open position.

Referring firstly to FIG. 1, this shows a buckle 2 of the type which may be used as a tensioning or length adjustment device for securing strapping, for example in the aviation and road transport industries. The buckle 2 is not limited to use in those industries and can be used in almost any situation where it is necessary to secure a length of material under tension, for example for securing a load or securing a curtain. The buckle 2 has a buckle body 4 comprising a base 5 and two opposing side walls 6, 8, such that the buckle body 4 defines a generally U-shaped channel. The side walls 6, 8 are spaced apart by a distance which is slightly larger than the width of a strap (not shown) which the buckle 2 will be used to secure, such that the strap can lie along the base 5 of the buckle 2 between the two side walls 6, 8.

The buckle 2 comprises a pivot pin 12 which passes through each of the side walls 6,8 and is secured thereto such that it extends between the side walls 6, 8 of the buckle body 4. A handle 10 comprising a pair of opposed legs 9, 11 is pivotally mounted on the buckle body 4 by engagement of the pivot pin 12 with a pair of elongate support slots 15 provided on the legs 9, 11 of the handle 10. The pivot pin 12 is cylindrical and has a circular cross section. The elongate support slots 15 have an oblong circle shape, or rounded rectangle shape, such that the handle 10 is able to slide relative to the buckle body 4 as will be discussed in more detail in relation to FIGS. 3 and 4. The elongate support slots 15 extend along a longitudinal axis of the handle 10.

Figure 2:
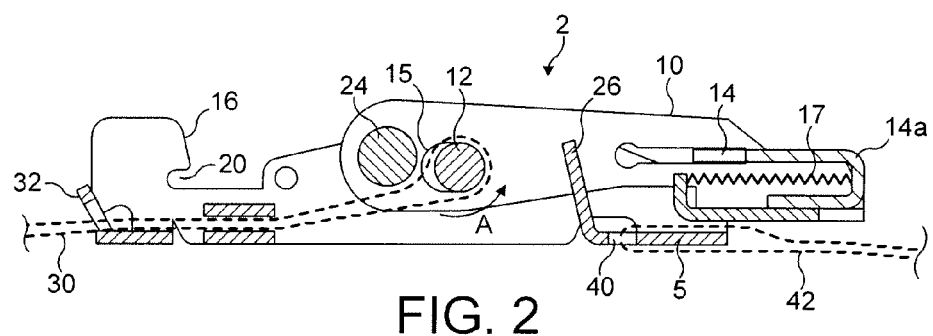
FIG. 2 is a side sectional view of the buckle of the buckle of FIG. 1 in an open position.
Figure 3:
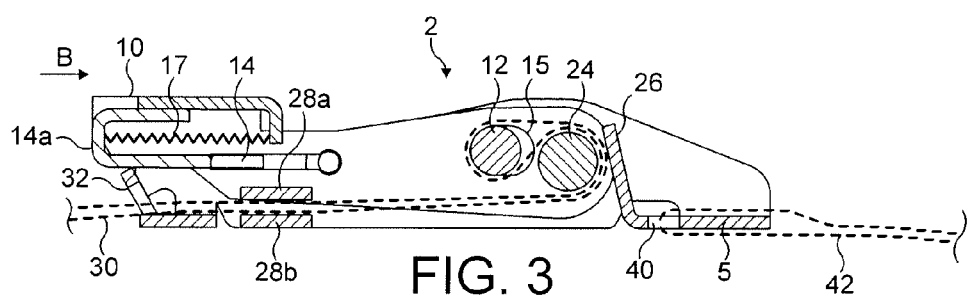
FIG. 3 is a side sectional view of the buckle of FIG. 1 in a first closed position.
Figure 4:
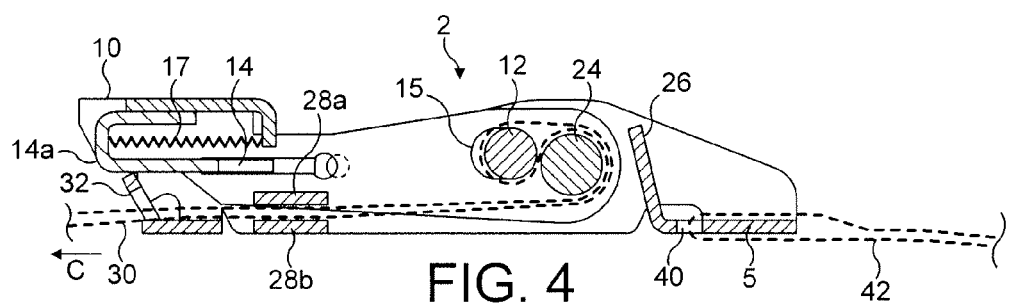
FIG. 4 is a side sectional view of the buckle of FIG. 1 in a second closed position.

The handle 10 is movable from an open position, as shown in FIGS. 1 and 2, to a closed position, as shown in FIGS. 3 and 4. In moving from the open position to the closed position the handle 10 is pivoted about the pivot pin 12. The handle 10 is provided with a spring biased latch 14 which functions as a locking mechanism to secure the handle 10 in the closed position during use. The side walls 6, 8 are provided with angled portions 16, 18 where the height of the side walls 6, 8 gradually decreases. The angled portions 16, 18 are associated with recesses 20, 22 such that when the handle 10 is moved from the open position to the closed position the spring biased latch 14, which is biased into a first position by a spring 17 housed within the handle 10, comes into contact with the angled portions 16, 18 of the side walls 6, 8 and is deflected into a second position, whereby it bypasses the angled portions 16, 18 of the side walls 6, 8 and is received in the recesses 20, 22. When the spring biased latch 14 is received in the recesses 20, 22 the buckle 2 is effectively "locked" in the closed position until a force is applied to a front portion 14a of the spring biased latch 14, in the direction of Arrow B in FIG. 3, to overcome the biassing force of the spring 17 and release the latch 14 from the recesses 20, 22. The spring 17 may be of any suitable form, such as a helical compression spring, a wire compression spring, or any other suitable spring.

The handle 10 further comprises a cam member 24 which extends between the legs 9, 11 of the handle 10 and is parallel to, but offset from, the pivot pin 12 when the handle 10 is mounted on the buckle body 4. When the handle 10 pivots about the pivot pin 12 the cam member 24 moves about the pivot pin 12 in a circular path. When the handle 10 is in the closed position, as will be described in more detail with reference to FIGS. 3 and 4, the cam member 24 engages with a strap threaded upon the buckle and forms part of a structure which defines a channel for the strap which serves to prevent it from slipping during use.

A strap trapping member 26 is provided at a rear portion of the buckle body 4 and in conjunction with the cam member 24 forms the structure which defines a channel for the strap 30 when the handle is in the closed position. The strap trapping member 26 is in the form of a plate which extends upwardly from the base 5 of the buckle body 4 and is angled towards the pivot pin 12. The angle of the plate relative to the pivot pin 12 will be described in more detail with reference to FIGS. 2-4. The function of the strap trapping member 26 is to define a channel for the strap 30 in conjunction with the cam member 24 to prevent slippage of the strap 30 during normal conditions of use. The strap trapping member 26 may profile or compress the strap 30 when the handle 10 is in the closed position, depending on the requirements of the buckle 2 and the thickness of the strap 30. In particular, the strap trapping member 26 is intended to prevent or reduce slippage of the strap 30 through the buckle 2 when it is subjected to repetitive high frequency (for example 1 Hz), low force cyclic loads, e.g. gust loads experienced in aviation.

When the handle 10 is moved into the closed position the cam member 24 moves into close proximity with the strap trapping member 26 (as shown in more detail in FIG. 3). The strap trapping member 26 extends between the side walls 6,8 but is not attached directly to them. The strap trapping member 26 is only supported at one end and thus acts as a simple spring. When the handle 10 is locked in the closed position the strap trapping member 26 and the cam member 24 will define a channel which either profiles the thickness of the strap 30 or compresses the strap 30. When profiling the strap 30 the distance between the strap trapping member 26 and the cam member 24 is approximately equal to, or slightly larger than, the thickness of a double layer of the untensioned strap 30, i.e. approximately 2-4 mm (a double layer of the strap will be trapped between the strap trapping member 26 and the cam member 24, as will be described in more detail in relation to FIG. 3). This ensures that the cam member 24 and the strap trapping member 26 define a channel for the strap 30 which profiles the strap 30 and prevents "ballooning", such that the risk of slippage is prevented or at least greatly reduced. The distance between the strap trapping member 26 and the cam member 24 when the handle 10 is in the closed position is referred to as the depth of the channel.

The strap trapping member 26 and/or the cam member 24 may have a roughened surface to increase friction between itself and the strap when the handle 10 is in the closed position. The surface of the strap trapping member 26 or cam member 24 may be knurled, toothed or provided with any other surface features which serve to increase friction between itself and the strap and prevent the strap from slipping.

The handle 10 and buckle body 4 are each provided with one of a pair of mating members 28. The mating members 28 are in the form of plates which are arranged such that when the handle 10 is moved from the open position to the closed position the mating members 28 come together to define a channel for a strap 30 therebetween. A first one of the mating members 28a is provided on the handle 10 and extends between the legs 9, 11 of the handle 10. A second one of the mating members 28b is provided on the buckle body 4 and extends between the side walls 6, 8. When the handle 10 is locked in the closed position the mating members 28 will define a channel which either profiles the thickness of the strap 30 or compresses the strap 30. When profiling the thickness of the strap 30 the distance between the mating members 28 is approximately equal to, or slightly larger than, the thickness of a double layer of a normal, untensioned strap 30, i.e. approximately 2-4 mm. This ensures that the strap 30 is channeled between the mating members 28, which serves to prevent "ballooning" of the strap 30 and reduce or prevent the risk of slippage. The distance between the mating members 28 when the handle 10 is in the closed position is referred to as the depth of the channel.

Either one or both of the mating members 28 may have a roughened surface to increase friction between itself and the strap 30 when the handle 10 is in the closed position. The surface of the mating member 28 may be knurled, toothed or provided with any other surface features which serve to increase friction between itself and the strap 30 and prevent the strap from slipping.

Referring now to FIG. 2, this shows a side sectional view of the buckle 2 of FIG. 1 in the open position. The buckle 2 is shown with a length of strap 30 attach to it, but not yet secured. When the buckle 2 is in the open position the strap 30 can be fitted and adjusted. The strap 30 may conveniently be formed from any suitable material as is commonly used with conventional buckles. This may include, but is not limited to, textile webbing, for example polyester and polypropylene webbing.

The strap 30 is fed into the buckle 2 through an aperture 32 at the front of the buckle 2 and passed around the pivot pin 12 and back out through the same aperture 32. The free end of the strap 30 is then pulled tight to take up any slack in the strap 30. When it is desired to secure the strap 30 under tension the handle 10 is moved from the open position to the closed position (as shown in FIG. 3).

The buckle 2 is provided with an aperture 40 at its rear end. A fixed length of webbing 42 passes through the aperture 40 and is looped back on itself and secured to itself to secure the buckle 2 permanently in place. The fixed length of webbing 42 may be the same piece of webbing as is wrapped around the handle 10, or it may be a different length of webbing.

As shown in FIG. 3, the handle 10 pivots about the pivot pin 12 and the cam member 24, which is mounted on the handle 10, moves around the pivot pin 12 in an anti-clockwise direction (as indicated by the Arrow A in FIG. 2) and engages the strap 30 and holds it under tension. The cam member 24 moves in a direction towards the strap trapping member 26 and traps a portion of the strap 30 in a channel between itself and the strap trapping member 26 (as shown in FIG. 3). As can be seen, the spring biased latch 14 has been received in the recesses 20, 22 in the side walls 6, 8 to "lock" the handle 10 into the closed position. In order to move the handle 10 back to the open position, to release or adjust the buckle 2, it is necessary to apply a force to the spring biased latch sufficient to overcome the biasing force of the spring. The force is applied to a front position of the latch 14*a* to release it from the recesses 20, 22. The force may conveniently be applied by grasping the handle 10 and latch 14 between thumb and forefinger and squeezing together, such that the latch 14 moves in a direction as indicated by Arrow B.

In addition to being held under tension by the cam member 24 the strap also passes through a channel defined by the cam member 24 and the strap trapping member 26 and is profiled or compressed by them. This serves to prevent, or at least reduce, the possibility of the strap 30 slipping under the high frequency, low force cyclic loads described above. The distance between the strap trapping member 26 and the cam member 24 when the handle 10 is in the closed position will be determined by the thickness of the strap 30 which the buckle 2 is designed to accommodate. When the strap trapping member 26 and cam member 24 are profiling the strap 30 the gap must be approximately the same depth as, or slightly deeper than, the thickness of a double layer of the strap 30. It is clear that the size of the gap will be dependent on the properties of the strap 30, but it will typically be in the region from 1-8 mm, more typically from 2-4 mm.

The strap trapping member 26 extends upwards relative to the base 5 of the buckle body 4. The strap trapping member 26 is angled towards the cam member 24 in order to improve the trapping mechanism. The angle of the strap trapping member 26 relative to the base 5 of the buckle body 4 is approximately 75□. In alternative embodiments of the buckle 2 the strap trapping member 26 may be orientated at right angles to the base 5 of the buckle body 4 or it may be orientated at a range of angles from 90□ to 45□ relative to the base 5 of the buckle body 4. It is even possible that the strap trapping member 26 may be angled away from the cam member 24, depending on the construction of the buckle 2. It will be clear to the person skilled in the art that the key feature of the strap trapping member 26 is its position relative to the cam member 24. In order to operate the strap trapping member 26 must be positioned such that it is in close proximity to the cam member 24 when the handle 10 is in the closed position. This ensures that the cam member 24 is able to define a channel between itself and the strap trapping member 26, which can restrict unwanted movement of the strap. When the handle 10 is in the closed position the distance between the strap trapping member 26 and the cam member 24 is known as the width of the channel.

Towards the front of the buckle body 4 the mating members 28 come together to provide a further trap for a strap. As discussed above in relation to FIG. 1, a first mating member 28*a* is provided on the handle 10 and a second mating member 28*b* is provided on the buckle body 4. When the handle 10 is moved from the open position to the closed position the mating members 28 come together to define a channel between them. The distance between the mating members 28 when the handle 10 is in the closed position is known as the width of the channel.

The mating members 28, which are provided on the handle 10 and the buckle body 4, come together when the handle 10 is moved into the closed position to define a further channel for the strap 30. The gap between the mating members 28 in the closed position will be similar to the gap between the strap trapping member 26 and the cam member 24, i.e. it will be the same width as, or slightly wider than, the thickness of a double layer of the strap 30. As with the strap trapping member 26 and the cam member 24 the size of the gap will be dependent on the properties of the strap 30, but it will typically be in the region from 1-8 mm, more typically from 2-4 mm.

The view in FIG. 3 shows the buckle in a first closed position. As discussed in relation to FIG. 1, the handle 10 is mounted on the pivot pin 12 by engagement with a pair of longitudinal slots 15. The slots 15 extend longitudinally along the length of the handle 10 and they are generally parallel to the base of the buckle 2 when the handle 10 is in the closed position. The slots 15 may be described as "horizontal" with respect to the base of the buckle 2. The slots 15 are configured such that the handle 10 can slide relative to the buckle body 4. Due to the orientation of the slots 15, the handle 10 is able to slide along a longitudinal axis of the buckle 2, as will be described in more detail below. In addition to functioning to bias the latches 14 into the locking position, the spring 17 also acts upon the handle 10 to bias it into the first closed position, as shown in FIG. 3. In the first closed position the cam member 24 is located in close proximity to the strap trapping member 26 and it functions to profile or compress the strap 30 between the strap trapping member 26 and the cam member 24.

When a pulling force, such as a gust load, acts upon the strap there is a tendency in conventional over-centre buckles for the strap to be pulled through the buckle, thus causing slippage. However, when a pulling force acts on the strap, in a direction illustrated by Arrow C in FIG. 4, the handle 10 slides along the longitudinal axis of the buckle 2 from the first closed position (as shown in FIG. 3) into a second closed position (as shown in FIG. 4). In moving from the first closed position to the second closed position the handle must overcome the biassing force of the spring 17. When the handle is in the second closed position the strap 30 is trapped between the cam member 24 and the pivot pin 12. The force of the compression between the cam member 24 and the pivot pin 12 is equal to the pulling force exerted on the strap 30, so the strap 30 is prevented from slipping through the buckle 2. As the pulling force subsides the spring 17 returns the handle 10 to the first closed position.

In the embodiment of the buckle 2 described in relation to FIGS. 1-4 the handle 10 is free to slide relative to the buckle body 4. This sliding relationship offers significant advantages over conventional over-centre buckles. When a pulling force is exerted on the strap 30 it would normally cause ballooning, or cause the strap 30 to gradually slip through the buckle 2. However, in the buckle 2 of FIGS. 1-4 the pulling action exerts a force on the handle 10 which is sufficient to overcome the biassing force of the spring 17. Effectively the pulling force actuates the sliding mechanism, which in turn prevents slippage by trapping the strap 30 between the cam member 24 and the pivot bar 12. The buckle 2 can be opened as described above and adjusted in the same way as a conventional over-centre buckle. In all other ways the buckle 2 functions in the same way as a conventional over-centre buckle, but it offers the additional benefit of being able to grip the strap tightly in response to a pulling force being exerted on the strap 30. It is believed that this will eliminate, or at least greatly reduce, slippage of the strap 30 through the buckle.

Although the embodiment of the buckle 2 described in relation to FIGS. 1-4 is provided with two strap trapping means it will be clear to the person skilled in the art that the buckle 2 could be provided with only one strap trapping means, i.e. either the strap trapping member 26 or the mating members 28, and it would still function satisfactorily. A particular advantage of the present invention is that both of the additional strap trapping means described are operated in the same action as the closing of the handle 10. This means that the buckle 2 can be utilised as a direct replacement for the currently available conventional buckles without the need to explain a new operating technique to the user. The user simply operates the buckle 2 in the conventional manner and this results in the strap trapping means engaging with the strap 30 to prevent, or reduce, slippage.

Figure 5:
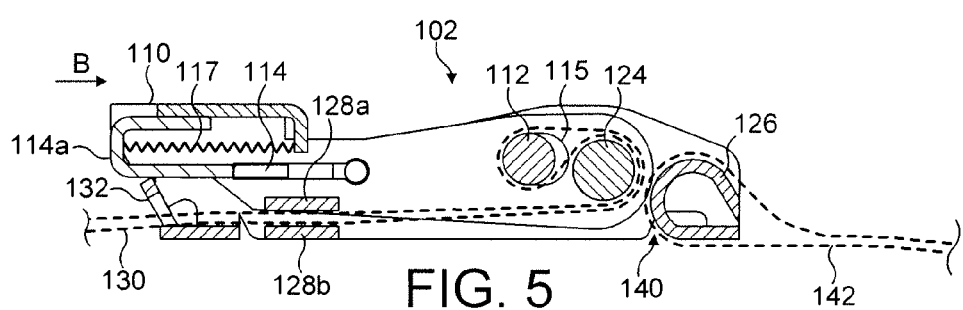
FIG. 5 is a side sectional view of a second embodiment of a buckle in a closed position.

A second embodiment of the present invention is shown in FIG. 5. The main structural features of this embodiment are generally the same as the first embodiment and the following description relates mainly to the different features of the second embodiment. Like parts will follow the same numbering system, with the reference numerals increased by 100.

The buckle 102 has a buckle body comprising a base and two opposing side walls, such that the buckle body defines a generally U-shaped channel. The side walls are spaced apart by a distance which is slightly larger than the width of a strap which the buckle 102 will be used to secure, such that the strap can lie along the base of the buckle 102 between the two side walls.

The buckle 102 comprises a pivot pin 112 which passes through each of the side walls and is secured thereto such that it extends between the side walls of the buckle body. A handle 110 comprising a pair of opposed legs is pivotally mounted on the buckle body by engagement of the pivot pin 112 with a pair of support slots 115 provided on the legs of the handle 110. The pivot pin 112 is cylindrical and has a circular cross section. The support slots 115 have an oblong circle shape, or rounded rectangle shape, such that the handle 110 is able to slide relative to the buckle body 104 as was discussed in relation to FIGS. 3 and 4. The support slots 115 extend along a longitudinal axis of the handle 110.

The handle 110 is movable from an open position, as shown in FIGS. 1 and 2, to a closed position, as shown in FIG. 5. In moving from the open position to the closed position the handle 110 is pivoted about the pivot pin 112.

The handle 110 further comprises a cam member 124 which extends between the legs 109, 111 of the handle 110 and is parallel to, but offset from, the pivot pin 112 when the handle 110 is mounted on the buckle body. When the handle 110 pivots about the pivot pin 112 the cam member 124 moves about the pivot pin 112 in a circular path. When the handle 110 is in the closed position the cam member 124 engages with a strap threaded upon the buckle and forms part of a structure which defines a channel for the strap which serves to prevent it from slipping during use.

A strap trapping member 126 is provided at a rear portion of the buckle body and in conjunction with the cam member 124 forms the structure which defines a channel for the strap 130 when the handle is in the closed position. The strap trapping member 126 is in the form of a plate which extends upwardly from the base of the buckle body and curves towards the pivot pin 112 and then away from it and back round towards the rear of the buckle 102. The general shape of the strap trapping member 126 may be described as "dome-shaped", or "rounded". The buckle 102 is provided with an aperture 140 at its rear end adjacent to, and in front of, the strap trapping member 126. A fixed length of webbing 142 passes through the aperture 140 and is looped around the strap trapping member 126 and then fixed to itself to provide a secure loop by which the webbing 142 is attached to the buckle 102. The attachment of the webbing 142 around the strap trapping member 126 provides a number of advantages. The interface between the buckle 102 and the webbing 142 is improved due to the lack of corners or sharp edges which could weaken the webbing 142 over time. In addition, the combination of the strap trapping member 126 into the webbing attachment means enables a reduction in the total length of the buckle 102, as compared to the buckle 2 design of FIGS. 1-4. This more compact design is desirable as it provides a reduction in weight and permits the buckle 102 to be used in confined spaces.

The strap trapping member 126 defines a channel for the strap 130 in conjunction with the cam member 124 to prevent slippage of the strap 130 during normal conditions of use. The strap trapping member 126 may profile or compress the strap 130 when the handle 110 is in the closed position, depending on the requirements of the buckle 102 and the thickness of the strap 130. In particular, the strap trapping member 126 is intended to prevent or reduce slippage of the strap 130 through the buckle 102 when it is subjected to repetitive high frequency (for example 1 Hz), low force cyclic loads, e.g. gust loads experienced in aviation.

When the handle 110 is moved into the closed position the cam member 124 moves into close proximity with the strap trapping member 126. When the handle 110 is locked in the closed position the strap trapping member 126 and the cam member 124 will define a channel which either profiles the thickness of the strap 130 or compresses the strap 130. When profiling the strap 130 the distance between the strap trapping member 126 and the cam member 124 is approximately equal to, or slightly larger than, the thickness of a double layer of the untensioned strap 130, i.e. approximately 2-4 mm (a double layer of the strap will be trapped between the strap trapping member 126 and the cam member 124). This ensures that the cam member 124 and the strap trapping member 126 define a channel for the strap 130 which profiles the strap 130 and prevents "ballooning", such that the risk of slippage is prevented or at least greatly reduced. The distance between the strap trapping member 126 and the cam member 124 when the handle 110 is in the closed position is referred to as the depth of the channel.

The surface of the strap trapping member 126 is covered by a single layer of webbing 142 as described above. In addition to reducing the total length of the buckle 102, this arrangement also provides an advantage in terms of the interaction of the strap trapping member 126 with the webbing 130. The webbing 142 increases the friction between the webbing 130 and the strap trapping member 126, without being so rough as to risk damaging the webbing 130. This serves to reduce the risk of the webbing 130 ballooning during use. Furthermore, the webbing 142 around the strap trapping member 126 is able to compress against the surface of the strap trapping member 126, which permits a greater range of webbing thicknesses to be used without adversely affecting the operation of the buckle 102.

The operation of the buckle 102 is the same as that of the buckle 2 shown in FIGS. 1-4. FIG. 5 shows the second embodiment of the invention with the handle 110 in its first closed position (as shown in FIG. 3). A pulling force exerted upon the webbing 130 will cause the handle 110 to move to its second closed position (as shown in FIG. 4).

Although the present invention has been described with reference to two embodiments it will be clear that the present invention is not limited or restricted by the embodiments described hereinbefore and any modification, alteration and substitution can be made within the scope of the claims.

The invention claimed is:

1. A buckle comprising a buckle body with spaced apart side walls and a pivot bar extending between the side walls, and a handle with a cam member and a pair of longitudinal support slots, the handle being mounted on the buckle body with the pivot bar received in the longitudinal support slots, the handle being pivotable about the pivot bar between an open position, in which a strap may be threaded upon the handle, and a closed position, in which tension is applied to the strap threaded upon the handle, wherein the engagement between the longitudinal support slots and the pivot bar additionally permits the handle to slide longitudinally relative to the buckle body.

2. A buckle according to claim 1, wherein when the handle is in the closed position it can slide from a first position, in which the cam member is spaced from the pivot bar, to a second position, in which it is adjacent to the pivot bar.

3. A buckle according to claim 2, wherein when the handle is in the second position, the strap threaded upon the buckle is trapped between the cam member and the pivot bar.

4. A buckle according to claim 2 or claim 3, wherein the handle is provided with a resilient biasing member which biases it into the first position.

5. A buckle according to claim 1, wherein the handle is provided with a locking member which is capable of engaging with the buckle body to secure the handle into the closed position.

6. A buckle according to claim 5, wherein a resilient biasing member biases the locking member into the closed position.

7. A buckle according to claim 1, wherein the buckle further comprises strap trapping means arranged such that when the handle is in the closed position the strap trapping means defines a channel for the strap threaded upon the handle.

8. A buckle according to claim 7, wherein the buckle comprises more than one strap trapping means.

9. A buckle according to claim 7, wherein, when the handle is in the closed position, the strap trapping means defines a channel for the strap which is the same width as, or slightly wider than, the thickness of the strap passing through the channel.

10. A buckle according to claim 7, wherein, when the handle is in the closed position, the strap trapping means defines a channel for the strap which compresses the strap passing through the channel.

11. A buckle according to claim 7, wherein the strap trapping means comprises a strap trapping member which is associated with the cam member, such that when the handle is moved from the open position to the closed position the cam member moves into close proximity with the strap trapping member.

12. A buckle according to claim 11, wherein the strap trapping member comprises a plate.

13. A buckle according to claim 12, wherein the plate extends upwardly from the base of the buckle.

14. A buckle according to claim 12, wherein the plate is perpendicular to the side walls.

15. A buckle according to claim 13, wherein the plate is angled towards the cam member.

16. A buckle according to claim 11, wherein the strap trapping member comprises a curved surface which opposes the cam member when the handle is in the closed position.

17. A buckle according to claim 16, wherein the strap trapping member is associated with an aperture in the rear of the buckle, such that a length of webbing may pass through the aperture and loop around the curved surface to attach it to the buckle.

18. A buckle according to claim 7, wherein the strap trapping means comprises mating members, a first member being provided on the handle and a second member being provided on the buckle body, the arrangement being such that when the handle is moved from the open position to the closed position the mating members come together to define the channel.

* * * * *